Nov. 25, 1969 H. A. JENSEN ETAL 3,479,792
PACKAGE BANDING MACHINE
Filed Sept. 11, 1967 10 Sheets-Sheet 1
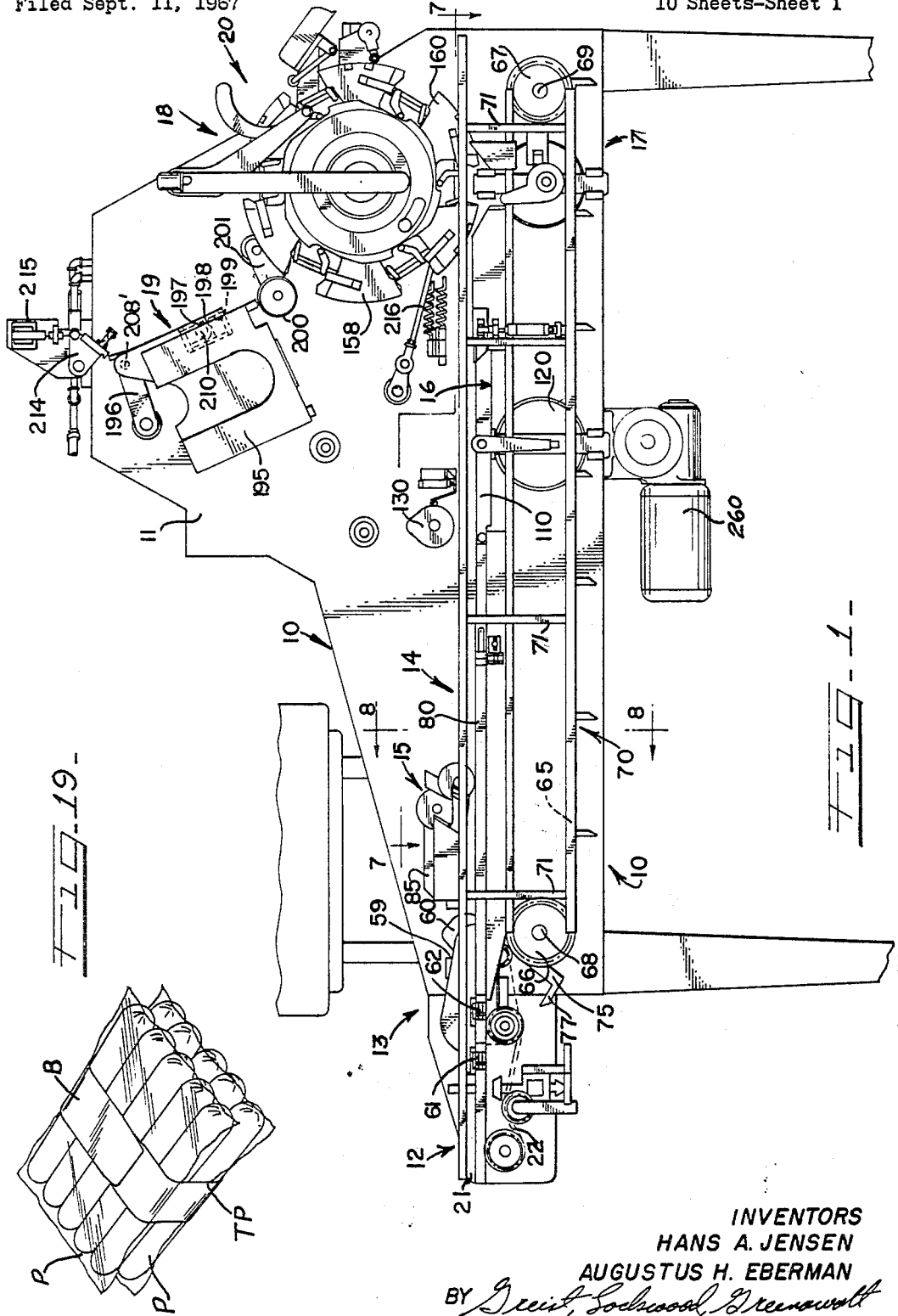
INVENTORS
HANS A. JENSEN
AUGUSTUS H. EBERMAN
BY
ATT'YS.

Nov. 25, 1969  H. A. JENSEN ETAL  3,479,792
PACKAGE BANDING MACHINE
Filed Sept. 11, 1967  10 Sheets-Sheet 2
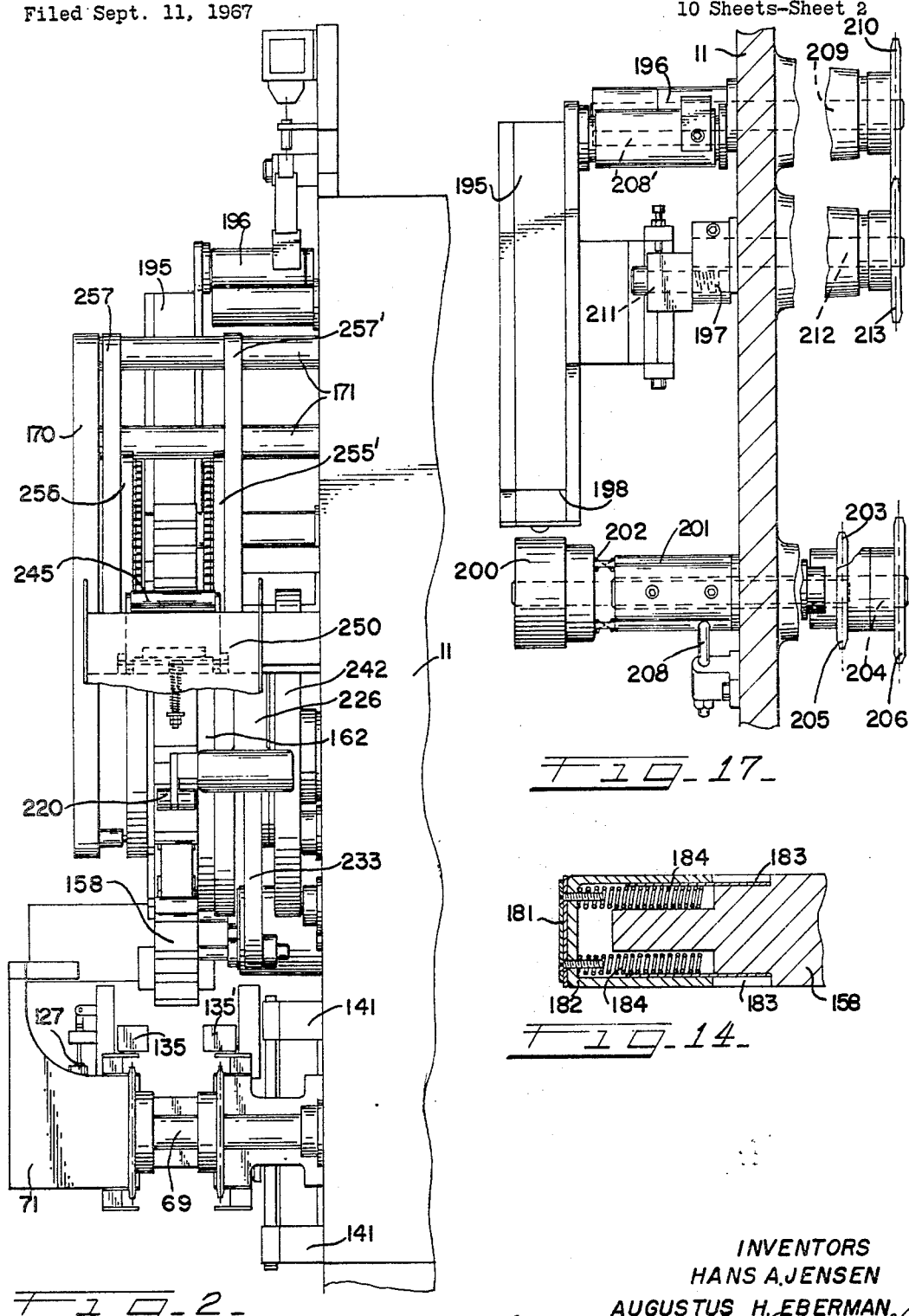
INVENTORS
HANS A. JENSEN
AUGUSTUS H. EBERMAN
BY
ATT'YS.

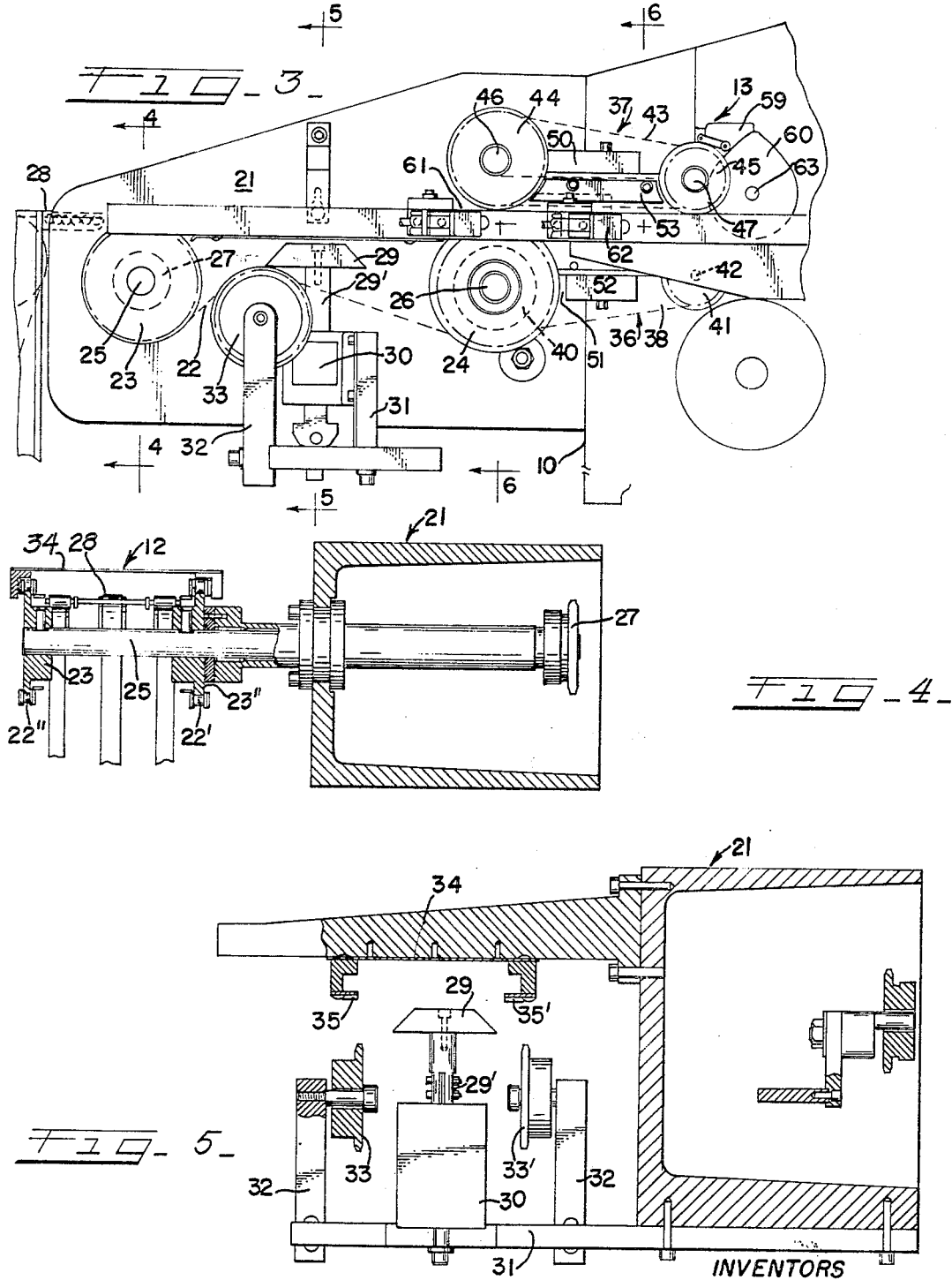

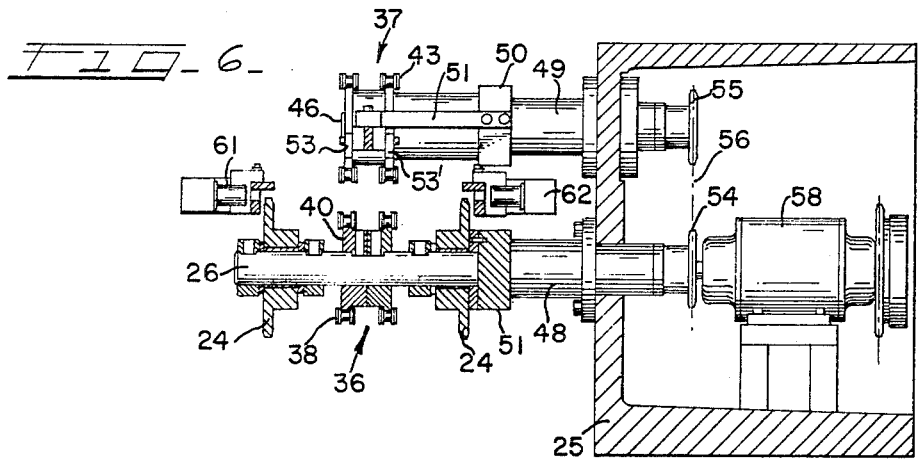
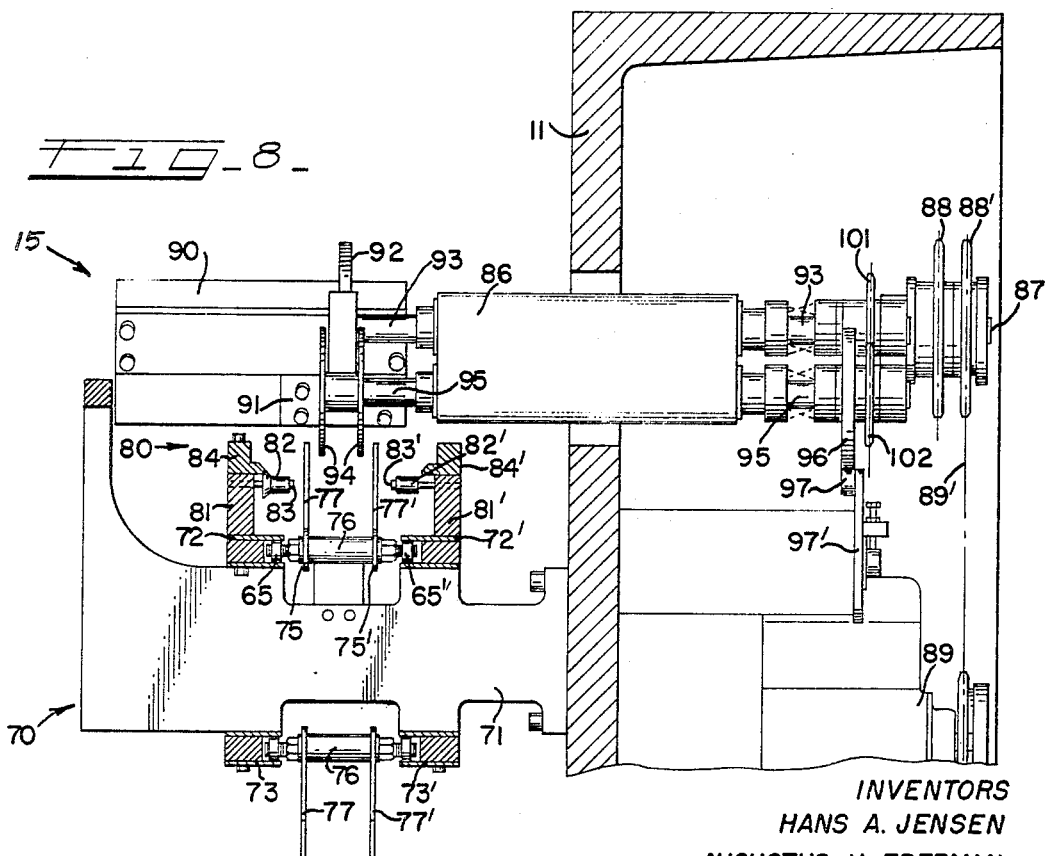

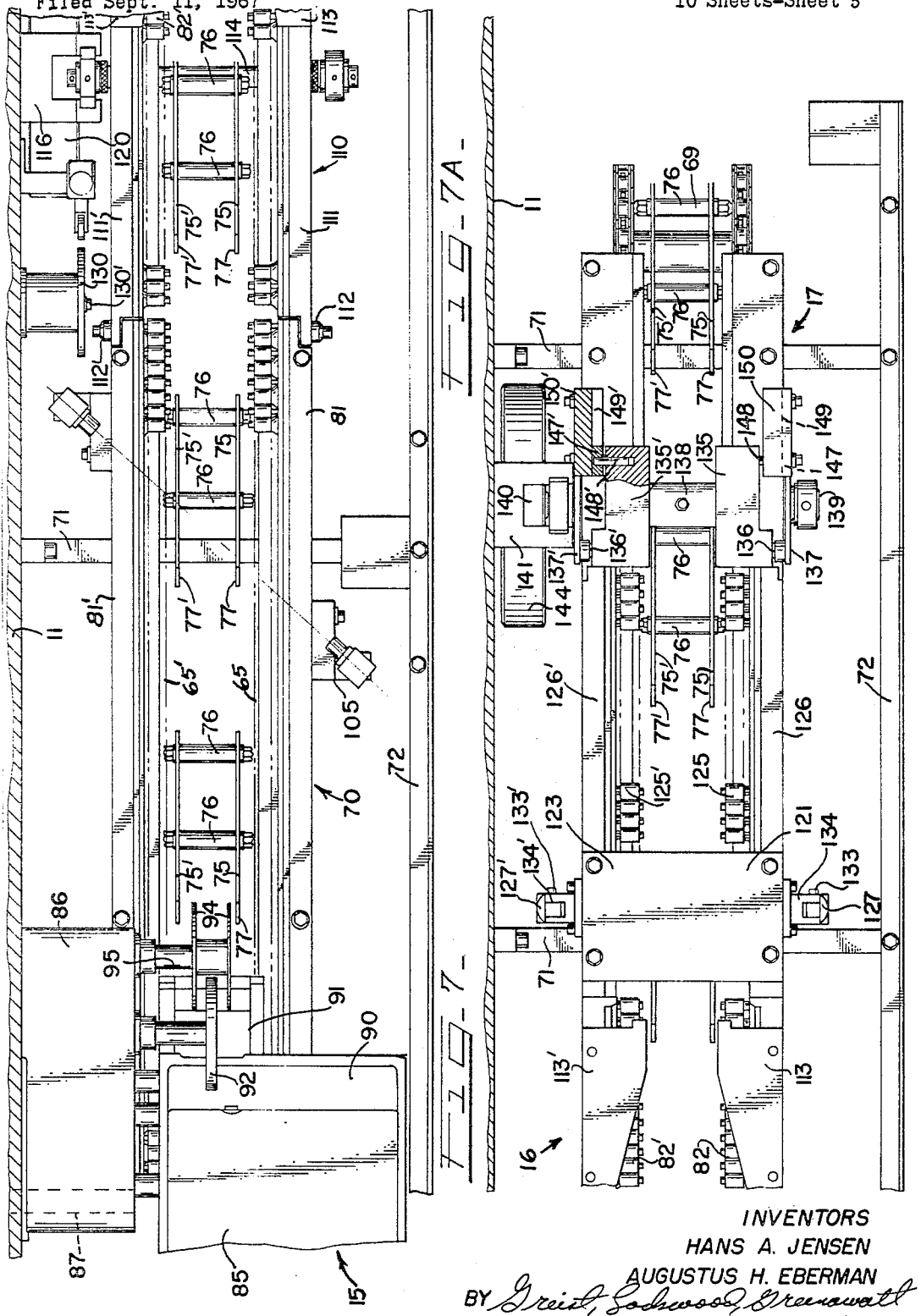

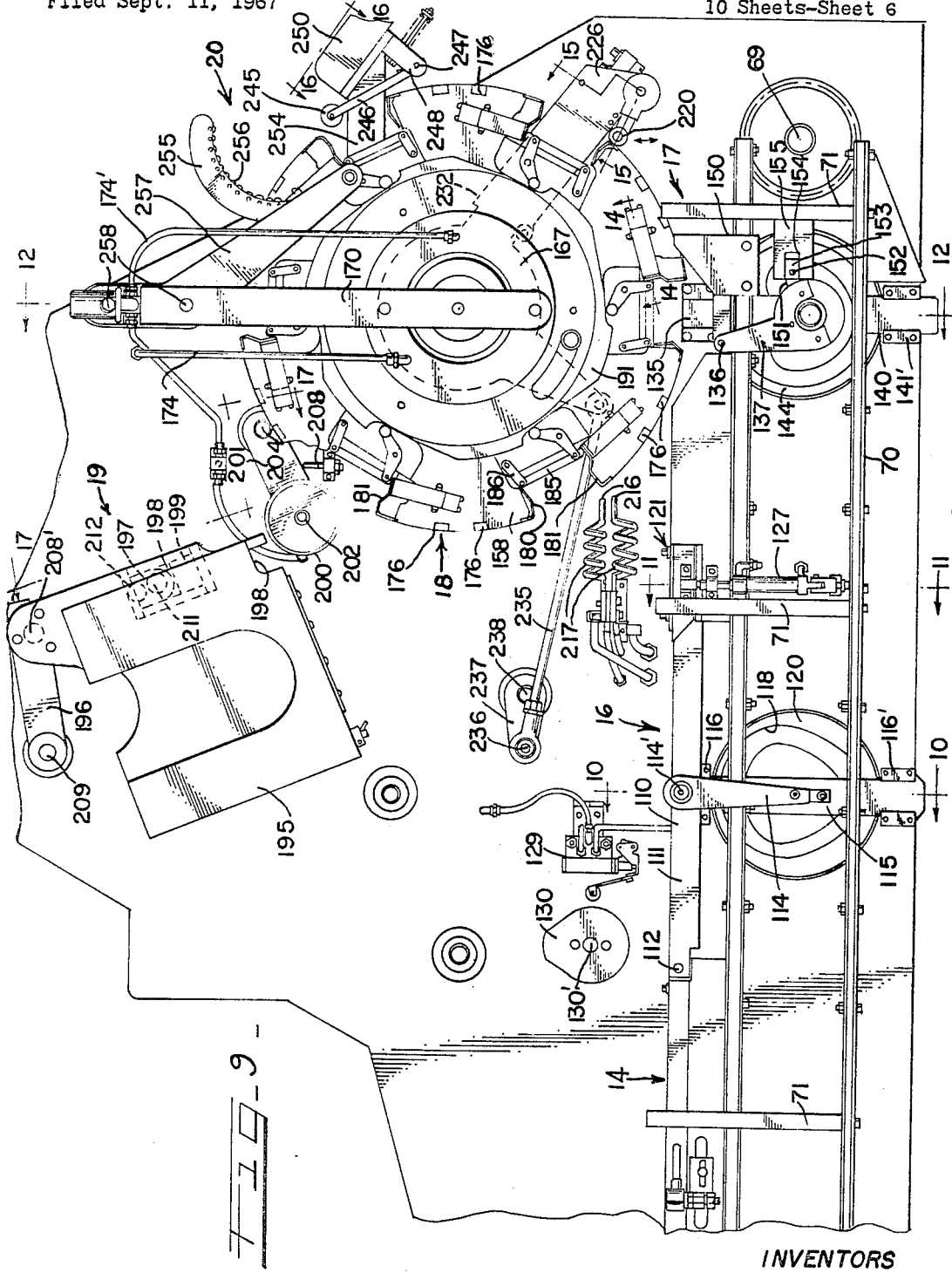

Nov. 25, 1969  H. A. JENSEN ETAL  3,479,792
PACKAGE BANDING MACHINE
Filed Sept. 11, 1967  10 Sheets-Sheet 7

INVENTORS
HANS A. JENSEN
AUGUSTUS H. EBERMAN
BY Driest, Lockwood, Greenawalt
& Dewey
ATT'YS.

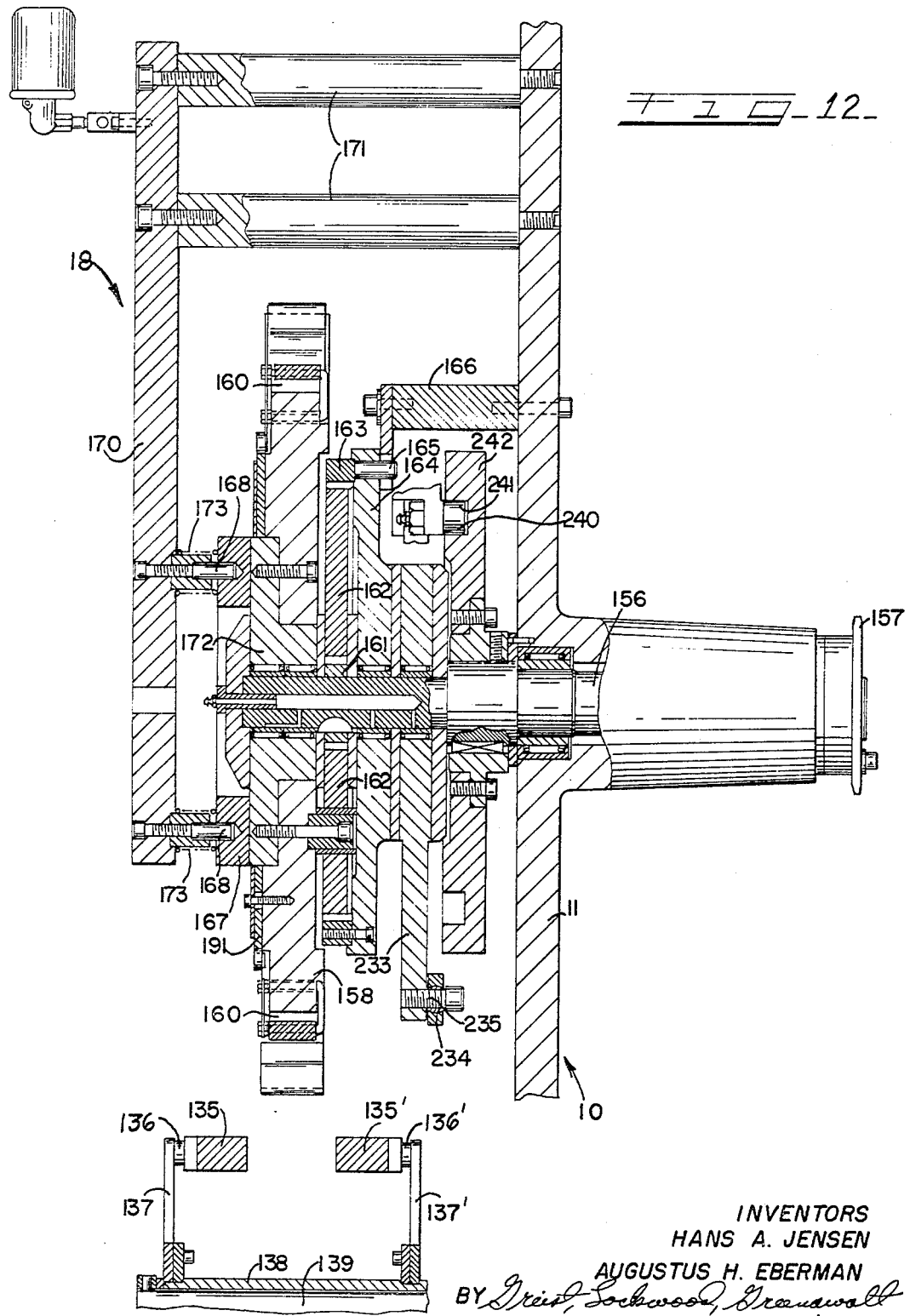

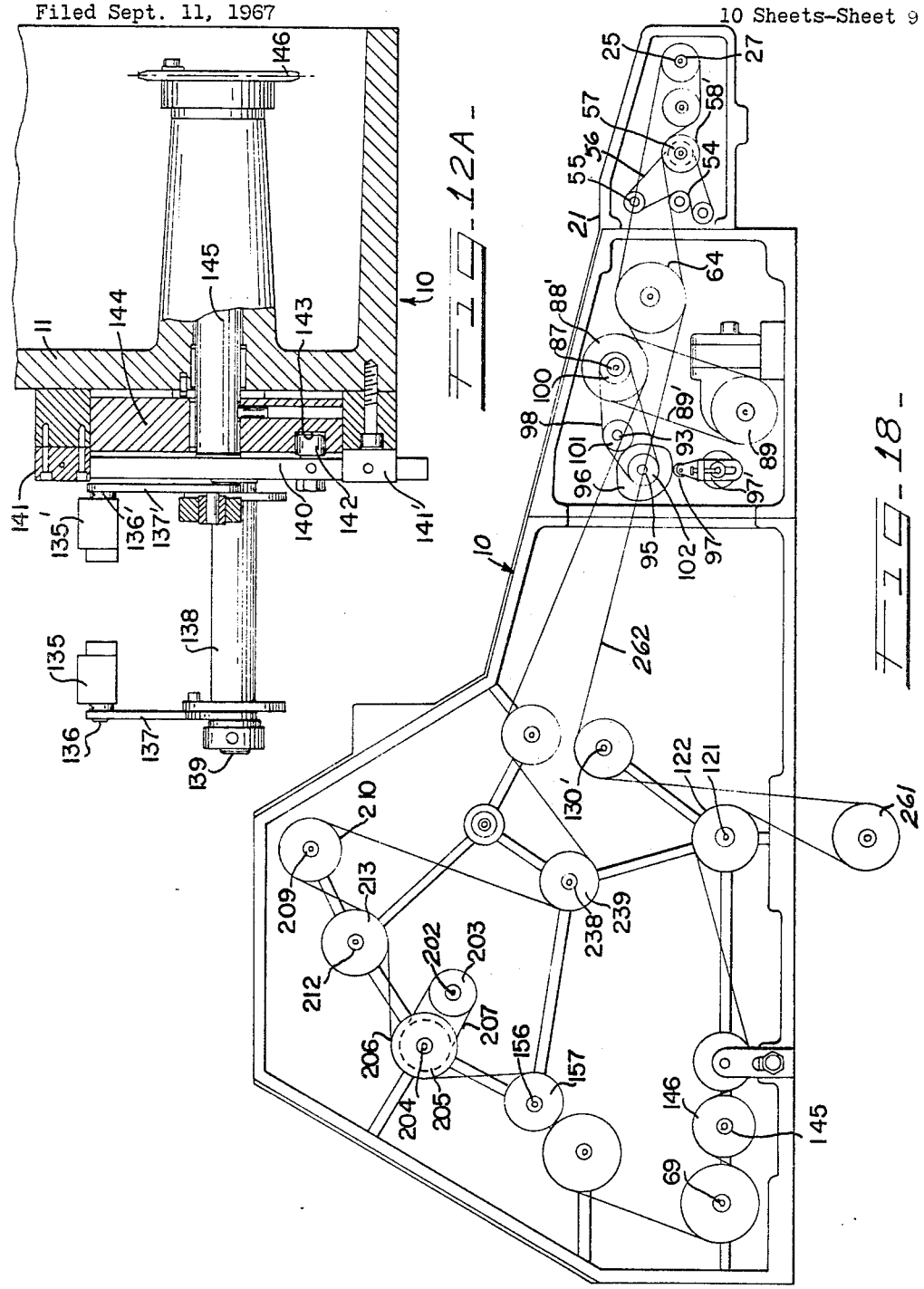

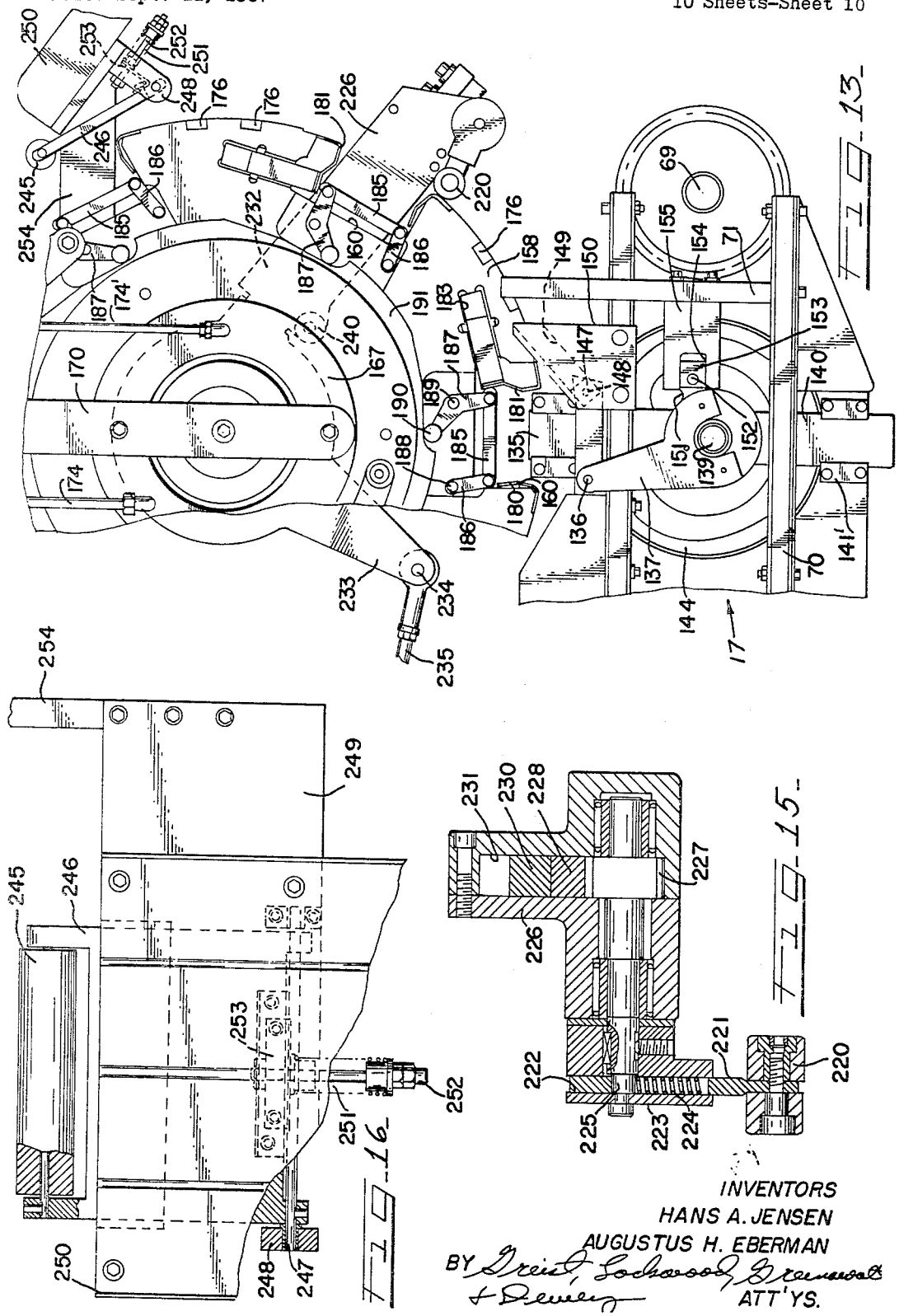

United States Patent Office 3,479,792
Patented Nov. 25, 1969

3,479,792
PACKAGE BANDING MACHINE
Hans A. Jensen and Augustus H. Eberman, Madison, Wis., assignors to Oscar Mayer & Co. Inc., Chicago, Ill., a corporation of Illinois
Filed Sept. 11, 1967, Ser. No. 666,634
Int. Cl. B65b *13/02, 17/00, 35/50*
U.S. Cl. 53—62                                      17 Claims

ABSTRACT OF THE DISCLOSURE

A stacking and banding machine which is characterized by a horizontally disposed infeed conveyor for receiving generally rectangular packages, for example, one-half pound packages of sausages, and for delivering the packages to a device which segregates the packages in pairs and advances successive pairs thereof to a horizontally disposed main conveyor where they are carried past a glue applicator and lines of glue are applied to the top surface of the trailing package of each pair thereof, the leading one of each pair of the packages is stacked on the trailing package and the assembly is delivered into a pocket of a turret operating in a vertical plane at the end of the main conveyor and receiving label forming bands which are fed from a supply magazine to the pockets of the turret for encircling the package assemblies, and mechanism associated with the turret for activating an adhesive on and rolling down the overlapping ends of each band, after which the banded package is ejected into a discharge chute.

---

This invention relates to packaging machinery and is more particularly concerned with improvements in a machine for assembling generally rectangular package units in pairs and for applying a label forming band about each assembly so as to form a double unit package.

In the marketing of certain products, particularly sausages, frankfurters and similar articles, it has been found desirable to enclose a predetermined number of the articles in a wrapper, preferably a transparent film, and thereafter to apply a label forming band about a stacked pair of such package units so as to form a double unit package. This type of twin package has been employed in the marketing of frankfurters and sausage products with considerable success. However, the package presents some production problems, particularly when high speed operations are desired. Some machinery has been designed to facilitate the assembly and banding operations required to produce the twin-type package but it has not been entirely satisfactory. The general object of the present invention is to provide an improved packaging or banding machine for this purpose which will accept random delivery of the single packages, automatically segregate pairs of the packages, stack successive pairs one upon the other, and apply a label forming band about each successive stacked pair thereof.

It is a more specific object of the invention to provide an apparatus which will operate automatically, on rectangular shaped packages or similar articles delivered thereto with random timing, to assemble the packages in paired relation, stack one of the packages of each pair on the other hand apply to the stacked assembly a relatively narrow band member which encircles the same and which may serve as a product identifying label or contain other desirable information.

It is a further object of the invention to provide an apparatus for automatically assembling in pairs generally rectangular articles of uniform size and shape and for delivering the same to a continuously traveling conveyor having associated mechanism for stacking the articles and presenting the stacked assemblies to a label applying mechanism.

It is a still further object of the invention to provide an article stacking and label applying apparatus of the type described wherein a mechanism is provided for supplying an adhesive between the contacting faces of the stacked articles so as to connect the same in separable relation prior to encircling each stacked assembly with a flexible band which may form a label for the resulting double unit package.

These and other objects and advantages of the invention will be apparent from a consideration of the article stacking and label applying machine which is shown by way of illustration in the accompanying drawings wherein:

FIGURE 1 is a side elevation, with portions broken away, of a machine for assembling in paired relation successive packages of sausages or the like, for stacking one package of each pair on the other package, and for applying an encircling band or label to each stacked assembly;

FIGURE 2 is an end elevation of the machine shown in FIGURE 1, to a larger scale;

FIGURE 3 is a partial side elevational view showing the infeed end of the machine to an enlarged scale;

FIGURE 4 is a cross section taken on the line 4—4 of FIGURE 3;

FIGURE 5 is a cross section taken on the line 5—5 of FIGURE 3;

FIGURE 6 is a cross section taken on the line 6—6 of FIGURE 3;

Figure 10:
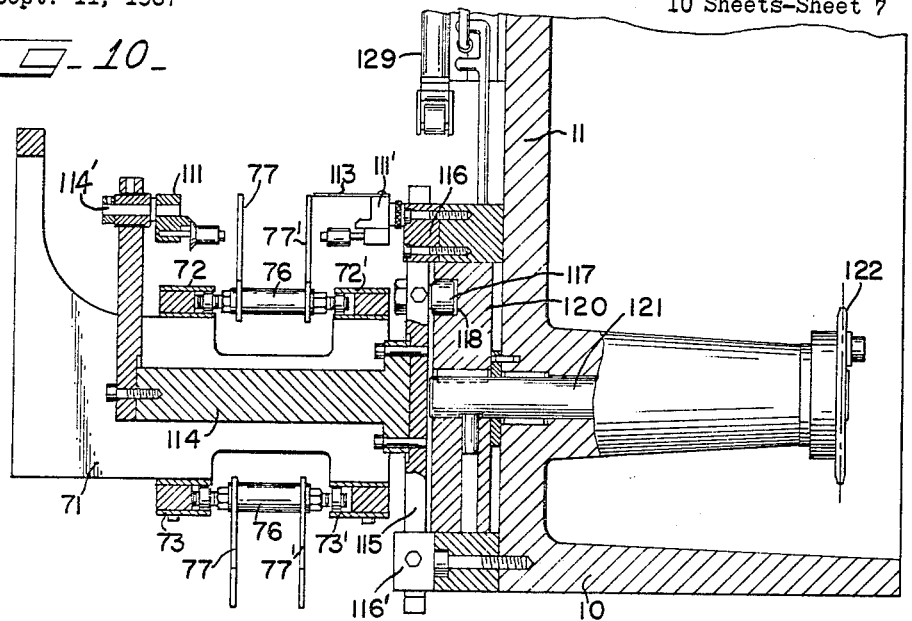
Figure 11:
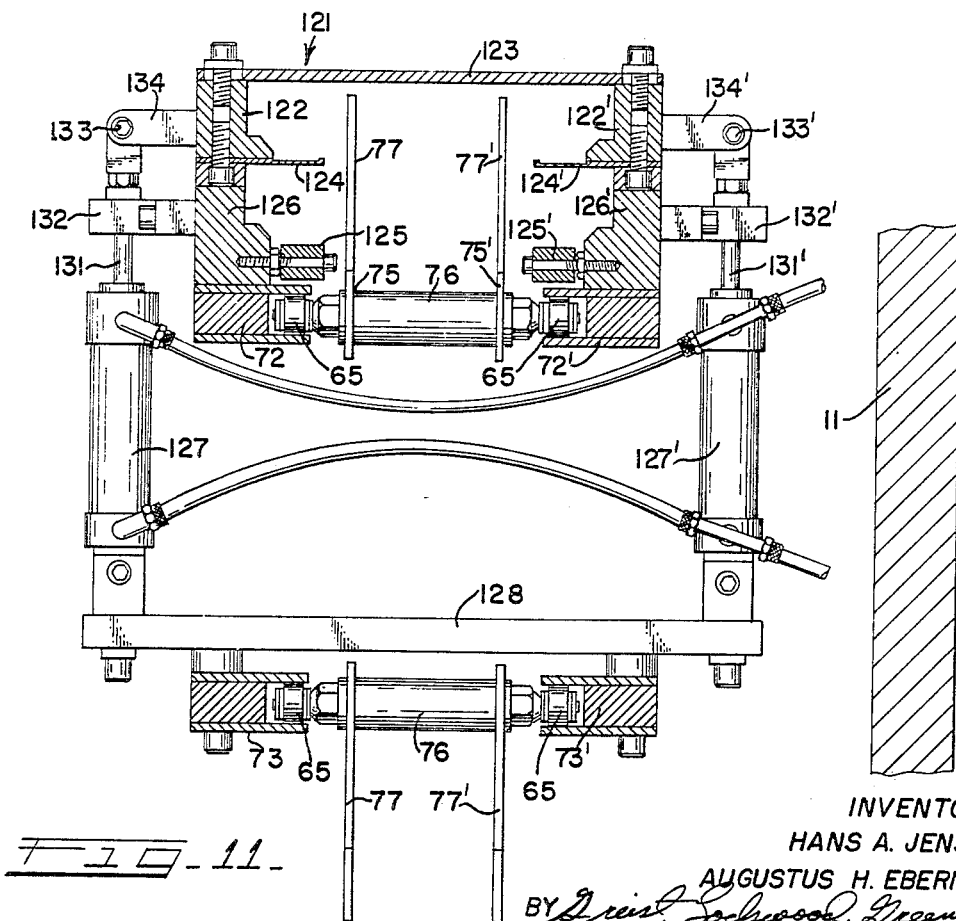

FIGURES 7 and 7A constitute a horizontal section taken on the line 7—7 of FIGURE 1, to a larger scale;

FIGURE 8 is a cross section taken on the line 8—8 of FIGURE 1, to a larger scale;

FIGURE 9 is a partial side elevational view, to an enlarged scale, showing the article stacking and brand applying end of the machine;

FIGURE 10 is a cross section taken on the line 10—10 of FIGURE 9 to a larger scale;

FIGURE 11 is a cross section taken on the line 11—11 of FIGURE 9, to a larger scale;

FIGURE 12 is a partial cross section taken on the line 12—12 of FIGURE 9, to a larger scale, showing the band applying turret mechanism;

FIGURE 12A is a partial cross section taken on the line 12—12 of FIGURE 9 to a larger scale, showing the transfer mechanism for lifting a stacked pair of package units into a pocket of the band applying turret;

FIGURE 13 is a fragmentary elevation, with portions broken away, showing a portion of the mechanism of FIGURE 9, to a larger scale;

FIGURE 14 is a cross section taken on the line 14—14 of FIGURE 9 to an enlarged scale;

FIGURE 15 is a cross section taken on the line 15—15 of FIGURE 9 to an enlarged scale;

FIGURE 16 is a fragmentary view taken on the line 16—16 of FIGURE 9, to an enlarged scale, showing the leading end roll down mechanism;

FIGURE 17 is a section taken on the line 17—17 of FIGURE 9 to an enlarged scale;

FIGURE 18 is a rear elevation of the machine, partly schematic, showing the drive mechanisms; and FIGURE 19 is a perspective view of the banded package formed on the machine.

Referring first to FIGURES 1 and 2 of the drawings, there is shown, for purposes of illustration, a machine embodying the principal features of the invention which is designed especially for receiving from a wrapping machine, or other source of supply, unit packages P (FIGURES 19) of a product of predetermined weight, for example, one-half pound packages of small sausages, frankfurters, or the like, which have been previously enclosed in transparent film or other suitable flexible packaging material, and which are delivered in regular order or with random timing to mechanism incorporated in the present machine, for assembling the packages in pairs, and for advancing the same to a traveling conveyor which carries the packages past a mechanism which is operative to apply lines of glue to the trailing package, after which the packages of each pair are stacked and the assembly is transferred to a pocket in a rotating turret for application of a combination band and label so as to form a twin package of one pound weight, the twin package being illustrated at TP in FIGURE 19.

The illustrated machine is mounted on an upright supporting frame 10 having a vertical face or wall 11 on which the major portion of the operating mechanism is mounted so as to extend laterally of the front side thereof with the drive mechanism being largely on the back side of the upright wall 11. The operating mechanism comprises an infeed device 12 which includes a sorting and timing apparatus 13 for delivering successive pairs of packages P to a main transporting conveyor assembly 14. The conveyor assembly 14 has an associated mechanism 15 for applying lines of adhesive to predetermined packages, a mechanism 16 for stacking the package in paired assemblies and a transfer device 17 adjacent the discharge end which delivers the package assemblies to the pockets of an overhead banding wheel or turret assembly 18. A band magazine 19 and associated mechanism for delivering label forming bands B (FIGURE 19) to the pockets of the rotating wheel 18 are mounted above the latter. An ejector mechanism, indicated at 20, is associated with the banding wheel assembly 18 for removing the completed packages TP.

The infeed device or unit 12 (FIGURES 1, and 3 to 6) at the entrance end of the conveyor 14 is mounted on a supplemental frame 21 which is attached to the end of the main frame 10. This unit comprises a conveyor 22 formed by a pair of laterally spaced chains 22' carried on pairs of sprockets 23, 23' and 24, 24' which are mounted in axially spaced relation on parallel shafts 25 and 26. The shaft 25 is journaled in the frame 21 and carries at its rear end a drive sprocket 27. The packages to be banded are delivered to the top run of the conveyor chains 22' from a packaging machine, or other supply source, on a V-belt conveyor or the like, indicated at 28, with random timing and spacing, and are advanced in the direction of the sorting and timing mechanism 13. The conveyor 22 has an associated device for interrupting the advance of packages by lifting a package off of the top run of the conveyor 22 and holding it so as to obstruct the advance of any following packages. The device comprises a platform-like member 29 (FIGURES 3 and 5) mounted on the top of a vertically disposed push-type solenoid arm 29' which extends upwardly of solenoid 30 and which is supported by a mounting bracket 31, the latter also carrying a bracket 32 on which chain tightening sprockets 33 and 33' are mounted. A horizontally disposed overhead plate member 34 is secured to the frame 21 which supports chain guides 35 and 35' and provides a surface against which a package is clamped by the solenoid operated table member 29. The operation of the solenoid 30 is controlled as hereinafter described. Normally, the chain conveyor 22 advances the packages to a point above the shaft 26 where they are gripped between vertically opposed runs of lower and upper double chain conveyors 36 and 37.

The lower chain conveyor 36 (FIGURES 3 and 6) comprises a pair of relatively closely spaced chain members 38 mounted on double end sprockets 40 and 41 carried on the parallel cross shafts 26 and 42, respectively, with the top run of the chains 38 being in alignment with the top run of the infeed conveyor 22. The sprocket 40 is keyed to the shaft 26 while the sprockets 24 and 24' carrying the chains 22' are mounted for rotation on the shaft 26 so that the conveyors 36 and 37 may be intermittently driven while the conveyor 22 is driven at a constant speed. The top conveyor 37 comprises a pair of closely spaced conveyor chain members 43 mounted on double sprocket members 44 and 45, which are carried on longitudinally spaced parallel shafts 46 and 47, the latter being disposed in vertical alignment above the shafts 26 and 42, respectively. The shafts 26 and 46 are journaled in bracket forming housings 48 and 49 (FIGURE 6) which extend laterally of the vertical face of the supplemental support frame 21. Brackets 50 and 51 (FIGURES 3 and 6) extend from the housings 48 and 49, respectively, and support chain guiding assemblies 52 and 53 for the opposed runs of the conveyors 36 and 37. The shafts 42 and 47 are journaled in the free ends of the guide assemblies 52 and 53. The shafts 26 and 46 are extended through the housings 48 and 49 and have sprockets 54 and 55 secured thereon which are connected by drive chain 56 with sprocket 57 (FIGURE 18) on an electric clutch and brake assembly 58 which the sprocket 58' driven by the main chain drive for the machine. The clutch and brake assembly 58 is under the control of a microswitch 59 (FIGURE 3) which is operated by constantly driven cam 60 and controlled by a pair of electric eye packaging sensing devices 61 and 62 which are spaced along the path of advance of the packages as they enter and move between the opposed runs of the chains 36 and 37 of the timing and sorting device 13. The electric eye sensing devices 61 and 62 are located at the entrance to the chains 36 and 37 and at a point spaced midway of the path between the two chains, respectively. The chains 36 and 37 are driven to advance the packages only when the sensing devices 61 and 62 indicate that two packages are present for advance by the chains 36 and 37. The timing is controlled by the microswitch 59 which is operated by the constantly driven cam 60. The cam 60 is mounted on the end of the shaft 63 which is journaled in the vertical frame plate 11 and carries on its rearward end a drive sprocket 64 (FIGURE 18). The electric eye sensing devices 61 and 62 and the microswitch 59 are connected into the circuit for operating the chains 36 and 37 so that these chains are continuously driven until a package passes the sensing device 61 and blocks the sensing device 62. This stops the chains 36 and 37 so that the package remains at the sensing device 62 until a following package blocks the sensing device 61. The chains 36 and 37 will then feed the two packages forwardly in properly timed relation with the operation of the continuously driven main conveyor 14 under the control of the cam operated microswitch 59. The microswitch 59 also imparts a time impulse to the solenoid 29 causing the platform 29 to move upwardly and clamp a package arriving at the end of the sorting unit against the top plate 34. This blocks the forward motion of all trailing packages so that only two packages will be fed to the conveyor chains 36 and 37 at one time.

The main conveyor 14 comprises a pair of endless chains 65 and 65' (FIGURES 1, 7 and 8) mounted on pairs of end sprockets 66 and 67 which are carried on cross shafts 68 and 69 disposed at the opposite lower ends of the main frame 10. The sprocket supporting shafts 68 and 69 are journaled in end portions of the vertical wall 11 of the main frame 10. A longitudinally extending supplemental frame structure 70 is carried on a plurality of longitudinally spaced bracket members 71, the latter extending laterally of the vertical wall 11 of main frame 10. The conveyor support frame 70 includes upper and lower track forming chain guide assemblies 72, 72' and 73, 73' (FIGURE 8) which support the chains 65 and 65' in laterally spaced relation. The chains 65 and 65' carry longitudinally spaced package engaging members of frame-like construction which include L-shaped side plates 75 and 75' (FIGURES 7, 7A and 8) mounted in spaced relation on longitudinally spaced cross bars 76 which extend between the chains 65 and 65' and which connect the same. The cross bars 76 are connected at their ends to pivot members connecting the chain links or link plates so as to pass around the end sprockets supporting the conveyor. The side plates 75 and 75' have portions 77 and 77' at right angles to the portions attached to the chains which form package engaging fingers. The packages are delivered to the infeed end of the conveyor 14 and onto a supporting structure 80 which is carried on the brackets 71 in spaced relation above the top run of conveyor chains 65, 65' so that the packages are engaged by fingers 77, 77' and advanced in a horizontal plane spaced above the top run of the chains.

The package supporting structure 80 (FIGURES 1, 7, 7A and 8) comprises side rail members 81 and 81' upstanding on the top chain guides 72 and 72' and carrying closely spaced, alternate, flanged and plane rollers 82 and 82' which are mounted on shafts 83 and 83' extending inwardly on the side rails 81 and 81'. The packages are supported on the rollers 82, 82' and held in line by side guide forming members 84 and 84' extending along the top of the rails 81 and 81'. The rails 81 and 81' are extended at the entrance end of conveyor 14 along the sides of the package sorting and timing apparatus 13 and support at their ends the electric-eye sensing devices 61 and 62, as shown in FIGURE 3.

A glue applicator device 15 (FIGURES 1, 7 and 8) is mounted above the path of travel of the packages at the entrance end of the main conveyor 14. The glue applicator apparatus comprises a two-compartment glue pot 85 carried on a bracket 86 (FIGURES 7, 8 and 18) which is secured on the end of pivot shaft 87 which shaft 87 is journaled in the vertical frame wall 11 and carries at its free end two overrunning clutches with drive sprockets 88 and 88'. One of these clutches 88 is driven by and kept in time with the machine when it is in operation while the second overrunning clutch 88' is driven by an independent small ratio motor 89 (FIGURE 18) with chain 89' connecting the clutch sprocket 88' to the same. The motor 89 is connected into the electrical circuit for the main drive motor in such a manner that when the main drive motor is stopped the ratio motor 89 will be started to drive the glue feeding mechanism so as to prevent glue from overflowing when the conveyor 14 is stopped. The glue pot 85 comprises the larger glue compartment 90 and a smaller compartment 91. The larger compartment 90 has an adjustable opening allowing a controlled amount of glue to pass from the larger compartment into the small compartment 91 on a single glue wheel 92 which is carried on a shaft 93 journaled in the bracket 86 and rotating in such a manner that it will carry excess glue from the small compartment into the larger and being of such capacity and location that it will maintain a constant level of glue in the small compartment 91. Two narrow edged glue applying wheels 94 are mounted in spaced relation on shaft 95 which is journaled in the bracket 86 and the wheels 94 rotate in the small glue compartment 91 in such a manner that they carry two beads of glue out of the pot onto a package passing below it and if not used return the glue to the pot. The glue pot 85 is oscillated on the pivot shaft 87 by a plate cam 96 (FIGURES 8 and 18) which is carried on the rear end of the shaft 95 and engages cam roller 97 which is adjustably mounted by bracket assembly 97' so as to lift and lower the glue pot assembly in timed relation with the operation of the conveyor 14 so that glue is applied only to the trailing package in each pair which advances on the conveyor 14. The shafts 93 and 95 are driven from the shaft 87 by chain 98 engaging sprockets 100, 101 and 102 on the shafts 87, 93 and 95, respectively.

The packages are carried by the conveyor 14 past an electric-eye sensing device 105 (FIGURE 7) with the leading package of each pair thereof being advanced by the trailing package which is engaged by a pair of pusher fingers 77, 77' on the conveyor 14. Each pair of packages is advanced to the stacking mechanism 16 (FIGURES 1, 7A, 9 and 10) so that the leading package is positioned on top of the trailing package. The stacking mechanism 16 comprises a hinged rail section 110 consisting of two short rail lengths or portions 111 and 111' which constitute extensions of the package supporting rails 81 and 81'. The rail portions 111 and 111' are pivoted at 112 and 112' to the ends of the rail members 81 and 81' so as to swing from a position in longitudinal alignment with or in the plane of the rails 81 and 81' to a position where the leading ends thereof are lowered toward the conveyor chains 65 and 65'. The rail portions 111 and 111' are provided with package supporting rollers 82 and 82' of the same construction and arranged in the same manner as on the rails 81 and 81' and constitute an extension of the package support provided by the latter. Top guide plates or guard plates 113 and 113' are provided on the end portions of the rail portions 111 and 111' and the two rail portions are pivotally attached at 114' to a generally U-shaped bracket formation 114. One side of bracket 114 is extended downwardly and constitutes a slide 115 operative, for vertical sliding movement, in upper and lower track forming members 116 and 116' which are secured on the vertical face of the main frame wall 11. The slide 115 carries a cam roller 117 which is operative in a cam groove 118 in a plate cam 120 which is mounted on the end of shaft 121, the latter being journaled in the main frame wall 11 and carrying at its rear end drive sprocket 122.

A platform assembly 121 (FIGURES 7A, 9 and 11) is disposed at the leading end of the guide rail section 110 on which the leading package of each pair thereof is deposited as it reaches the end of the guide rail section 110. The platform assembly 121 has a vertical reciprocating movement so as to elevate the leading package and permit the trailing package to be positioned beneath the same when the rail section 110 is swung to a position where the leading end thereof is lowered. The platform assembly 121 comprises a pair of short side rail portions 122 and 122' connected by a top plate 123 and carrying shelf forming plates 124 and 124' spaced below the plate 123 and normally spaced above a set of rollers 125 and 125' which are mounted on horizontally disposed fixed side rail members 126 and 126' extending above the conveyor chain guides 72 and 72'. The platform assembly 121 is raised and lowered by operation of a pair of air cylinders 127 and 127' which are mounted in vertically disposed relation on a cross frame member 128 and controlled by air valve 129, operated by cam 130 on the end of driven shaft 130'. Pistons 131 and 131' extend through guide apertures in brackets 132 and 132' which project laterally of the fixed rails 126 and 126' and are pivotally connected at 133 and 133' to angle brackets 134 and 134' extending laterally of the rail members 122 and 122'. Cylinders 127 and 127' are operated under the control of air valve 129 and the associated cam 130 so as to raise and lower platform assembly 121 in timed relation to the movement of conveyor 14 with the swinging movement of the rail section 110 being properly timed and coordinated therewith so as to deposit the leading package of each pair thereof on plates 124 and 124' of platform assembly 121 and to swing down for deposit of the trailing package on the roller assemblies 125 and 125' while the platform assembly 121 is raised by operation of the cylinders 127 and 127' to provide clearance for the trailing package beneath the leading package. Both packages are then picked up by pusher fingers 77, 77' and advanced to the transfer device 17 for delivery to the band applying wheel 18.

The transfer mechanism 17 (FIGURES 1, 7A, 9, 12 and 12A) comprises a pair of package support pads 135 and 135' and associated apparatus for imparting an angular motion to the same in timed relation to the movement of the conveyor chain 14 and the band applying wheel 18 so as to position a twin package transported by the conveyor 14 directly under a pocket in the banding wheel 18 for transfer into the same. The package supporting pads 135 and 135' are given both upward and forward motion, with the forward motion matching the forward motion of the conveyor 14 and the rotation of wheel 18, so as to transfer the package assembly into a wheel pocket without interrupting the continuous motion of the conveyor and the wheel. The pads 135 and 135' are pivotally connected at 136 and 136' to the upper ends of arm members 137 and 137' which are connected in spaced relation by a pivot forming tube 138 rotatably supported on a shaft 139 extending forwardly of a vertically disposed slide 140. The slide 140 is mounted for movement in a vertical path in upper and lower track forming brackets 141 and 141' which extend outwardly of the main frame member 11 and are vertically spaced. The slide bar 140 has a cam roller 142 operating in a cam slot 143 in the plate cam 144 which is carried on the end of a shaft 145, the latter being journaled in the vertical frame plate 11, and having a drive sprocket 146 on the other end thereof. Pads 135 and 135' are connected at their forward ends to slide blocks 147 and 147' by pivots 148 and 148' and the blocks 147 and 147' are received in upwardly inclined track formations 149 and 149' in cam plates 150 and 150' which are mounted on the subframe 70. A lever arm 151 extends radially from the tube 138 and has its free end pivotally attached at 152 to a slide block 153 which is received in a horizontally disposed track 154 in a cam member 155 which is secured to the end bracket 71 for the subframe 70. Rotation of the cam plate 144 is synchronized with the operation of the conveyor 14 and the wheel 18 through a connecting drive as hereinafter described so as to raise the pads 135 and 135' and carry them forward simultaneously in timed relation to the advancing movement of the conveyor 14 in order to elevate successive package assemblies against the bands and deliver the same to the pockets of the band applying wheel 18.

The band applying wheel assembly 18 (FIGURES 1, 9 and 12) is mounted on a shaft 156 which is journaled in the vertical wall 11 and carries at its rear end a drive sprocket 157. The assembly 18 includes a package pick-up or band applying wheel 158 having a series of pockets 160 cut into the periphery thereof for receiving the labels and package assemblies. The wheel 158 is rotatably mounted on the end of the shaft 156 and driven through a planetary gear system which includes the pinion 161 keyed to the shaft 156, gears 162 journaled on the back face of the wheel 158 and ring gear 163 carried on a hub 164 which is pinned at 165 to a bracket 166 fixed on the face of the frame wall 11. A vacuum manifold 167 is carried in sliding relation relative to the axis of the shaft 156 on the pins 168 extending rearwardly of a fixed vertical member 170 which is mounted in spaced relation outwardly of the frame wall 11 by connecting bar members 171. The vacuum manifold 167 is pressed against the hub forming portion 172 of the wheel 158 by compression springs 173 cooperating with the pins 168 and has a connection with a vacuum source through the conduits 174 and 174'. The vacuum manifold 167 is connected by suitable cooperating passageways (not shown) in the manifold and the wheel 158 with outlets or vacuum ports indicated at 176 (FIGURES 9 and 13) on the periphery of the wheel, so that upon rotation of the wheel 158 vacuum will be applied to the label or band gripping ports 176 at each side of the pockets 160 when the bands B are delivered to the peripheral surface of the wheel so as to grip the ends of the band and hold the same spanning a pocket 160 until the package assembly is inserted in the pocket by the transfer mechanism 17 when the vacuum is cut off to release the band ends. Each of the pockets 160 is provided with package gripping spring clips 180 and 181 (FIGURES 13 and 14) at opposite sides thereof. The one clip 181 is mounted for sliding movement on a carriage forming member 182 of U-shaped cross section with the leg forming portions thereof seated in guideways 183 formed in opposite faces of the wheel 158. The member 182 is urged in the direction of the clip 180 by compression springs 184. A stop plate 185 is disposed at the bottom of each pocket 160 which is pivotally connected at its opposite ends to a link 186 and the one arm of a bell crank lever 187. The link 186 and the crank 187 are pivotally mounted on the main portion of the wheel 158 at 188 and 189. The bell crank 187 carries on its other arm a cam roller 190 which engages the track forming edge of a rotatable cam plate 191. Each pocket 160 has this same arrangement. The cam plate 191 is adjustably clamped to the face of the wheel member 158 and may be rotated about the wheel axis to change the position of the bottom forming stop plate 185 through cam roller 190 and the position of spring pressed clip 181 through engagement of link 186 with the latter so that the depth and width of all the pockets may be adjusted proportionally by rotating the cam plate 191 on the wheel member 158.

The package encircling bands are delivered to the peripheral surface of the wheel member 158 for retention in spanning relation over the pockets 160 from a magazine 195 (FIGURES 1 and 9) which carries a supply of the bands stacked therein. The magazine 195 is mounted on a supporting arm 196 and a rotating crank 197 which are operated to impart a generally elliptical movement to the forward lower corner of the magazine 195 where it is cut away at 198 to permit withdrawal of the lowermost band from the stack therein by a transfer wheel 200. The transfer wheel 200 is a rubber covered vacuumized wheel mounted on the end of a pivoted arm 201. The wheel 200 is carried on a shaft 202 journaled in the end of the arm 201 which is driven by means of the sprocket 203 (FIGURE 17) on the rear end of the same. The arm 201 is mounted on the shaft 204 which carries at its rear end a pair of sprockets 205 and 206 (FIGURE 18) rotatably mounted thereon, with the sprocket 205 connected in driving relation with sprocket 203 by the chain 207 and the sprocket 206 driven by the main machine chain drive. There is an adjustably mounted stop 208 (FIGURE 17) on the wall 11 which determines the position of the roller 200 relative to the peripheral surface of the wheel 158. The magazine 195 is pivotally connected at 208' to the free end of the arm 196. The arm 196 is mounted at its other end on the pivot shaft 209 which extends through the frame plate 11 and carries at its other end an idler sprocket 210. The crank 197 is pivotally connected at 211 to the magazine 195 and is carried on the end of a shaft 212 which is journaled in the frame wall 11 and carries a drive sprocket 213 (FIGURE 18) at its rearmost end. A pivotally mounted latch arm 214 (FIGURE 1) is mounted adjacent the free end of the lever arm 196 which is operated by solenoid 215 and controlled by the electric eye sensing device 105 so as to interrupt the feed of the bands, by engaging arm 196 and holding the magazine 195 in upwardly swung non-feeding position, in the absence of a package assembly. The bands are fed only when there is a package assembly on the conveyor 14 for delivery to the proper pocket 160.

Heater elements 216 (FIGURE 9) are mounted adjacent the periphery of the wheel 158 which may be in the form of perforated tubing with coiled sections 217 which are electrically heated. The tubing is connected to an air supply so as to provide hot air for activating an adhesive on the ends of the bands as they pass by the elements 216 on the way to the loading station where the transfer mechanism 17 inserts a package assembly in the pocket 160 over which the band is positioned. The air passes through the heated coils 217 and is directed by the perforated portions of the tubing against the band ends as each band passes the same.

As the wheel 158 advances a band and package assembly beyond the transfer mechanism 17 the package assembly is frictionally retained or clamped in the wheel pocket 160 with the band surrounding it on three sides, the vacuum gripping of the band ends is discontinued and both ends of the band extend radially from the wheel. The trailing end of the band is first rolled down on the package assembly and the leading end is thereafter rolled down into overlapping relation and adhered thereto. The mechanism for rolling down the trailing end of the band comprises a roller 220 (FIGURES 13 and 15) mounted on the end of the slide member 221 which is operative in a guideway 222 in an arm 223 and urged by the compression spring 224 in the direction radially outwardly of the pivot shaft 225 on which the arm 223 is mounted. The shaft 225 is journaled in the outer end of the housing 226 and carries a pinion 227 engaging a rack 228 on the end of an arm 230 which is slidable in the guideway 231 in the housing 226.

The housing 226 constitutes part of an oscillating arm structure 232 (FIGURES 9 and 12) which is rotatably supported on the shaft 156 and has a rocker arm 233 which is pivotally connected at 234 to rod 235. The rod 235 is pivoted at its other end at 236 to a crank arm 237 mounted on shaft 238. The shaft 238 is journaled in the frame plate 11 and has a driven sprocket 239 at its rear end. The rack 228 carries a cam follower roller 240 (FIGURE 12) which engages in a track 241 in a cam plate 242 which is keyed to the shaft 156. The cam plate 242 is rotated by the shaft 156 and timed so as to impart radial motion to the rack 228 which in turn moves the ironing roller 220 toward the wheel 158 while the housing 226 is oscillated so as to roll down the trailing end of the band as the pocket carrying the same moves at a slower speed past the roller carrying slide 221 which is swung, through reciprocation of the rack 228, to move the roller 220 in the direction of advance of the wheel 158.

The leading end of the band is ironed down as it passes beneath an ironing roller 245 (FIGURES 9 and 16) which is mounted on a U-shaped frame 246 pivoted at 247 to supporting brackets 248 depending from the bottom of a discharge chute 250. The roller 245 is urged in the direction of the wheel 158 by spring 251 mounted on pin 252 which is secured beneath the chute 250 with the end of the spring 251 bearing against an upstanding bracket arm 253 on the frame 246. The discharge chute 250 is mounted on a supporting bracket 254 attached to the frame wall 11. This completes the banding of a package assembly which is thereafter ejected by mechanism 20 from the pocket 160 and delivered to the discharge chute 250 which removes it from the machine.

The ejector mechanism 20 comprises a pair of curved plate sections 255 and 255′ (FIGURE 9) each having a series of rollers 256 mounted adjacent the outermost edge. The plate sections 255 and 255′ are supported on a pair of bracket arms 257 and 257′ mounted on the support rods 171 which extend from the vertical wall 11. The bracket arms 257 and 257′ at the lower ends of the plate members 255 and 255′ straddle the wheel 158 so as to extend beneath the projecting ends of the package assembly as the latter is advanced by the rotation of the wheel 158 and to pick the banded package out of the pocket 160 and direct it into the chute 250.

The main drive for the machine comprises a drive motor 260 (FIGURE 1) and associated speed reduction mechanism having an output sprocket 261 (FIGURE 18) which drives a chain 262 constituting a main drive member engaging the various drive sprockets referred to in describing the operating parts of the machine. The drive chain 262 and the various drive sprockets are mounted on the back side of the vertical frame wall 11, the latter being slotted where required to permit oscillating movement of the adhesive applicator 15 and adjustment of the label feed roll 220. The necessary idler sprockets are provided to enable the tension in the drive chain to be adjusted and to provide the proper direction of rotation for the various drive sprockets.

In using the apparatus the packages P which are of generally rectangular shape, or similar articles to be banded, are delivered by conveyor 28 (FIGURE 1) or any other suitable means to the infeed conveyor 22, in either regular order or with random spacing, and advanced on conveyor 22 to the chain conveyors 36, 37. When a leading package reaches the sensing device 61 the conveyor chains 36, 37 are operated to advance the package to the sensing device 62 and the conveyor chains 36, 37 are stopped until a following package reaches the sensing device 61 when the chains 36, 37 are operated to advance the pair of packages to the main conveyor 14. The platform 29 is raised by operation of the solenoid 30 when the second package is at the sensing device 61 to interrupt the flow of packages until the leading pair is moved ahead on to the conveyor 14. The adhesive applying mechanism 15 is oscillated, in timed relation to the advance of the packages, to apply two lines of adhesive to the top surface of the trailing package as it passes beneath the adhesive applying discs or wheels 94. The packages are moved along on the rollers 82, 82′ by pusher member 77, 77′ on the conveyor 14 until the leading package reaches the stacking mechanism 16 (FIGURE 9) where the leading package is deposited on the plates 124 and 124′ (FIGURE 11) and the latter are raised by operation of the cylinders 127, 127′ under the control of valve 129. As the trailing package moves onto the hinged section 110 the latter is tilted downwardly so that the package is advanced onto the rollers 125, 125′ beneath the leading package and the platform device 121 moves down to deposit the leading package on the trailing package and the two stacked packages are advanced by pusher members 77, 77′ to the transfer device 17 (FIGURES 9 and 13) beneath the banding wheel or turret assembly 18, the transfer blocks 135, 135′ being in lowered position beneath the path of the oncoming package assembly. When the package assembly is over the transfer blocks 135, 135′ the latter are operated to lift the package assembly into a pocket 160 on the banding wheel member 158. The transfer blocks are moved in an elliptical path so as to lift the package assembly free of the pusher members 77, 77′ and simultaneously carry the assembly forwardly and upwardly into the banding wheel pocket 160 while the conveyor 14 and the banding wheel 158 are advancing. The labels or bands B are fed, one by one, from the bottom of the oscillating magazine 195 by the vacuum roller 200 and delivered in proper timed relation to the vacuum gripper ports 176 on the periphery of the wheel 158 so as to span the pockets 160, which are adjusted to the proper depth and width to accommodate the package assemblies. The package assemblies are held in the pockets 160 by the spring members 180, 181 as the wheel assembly 18 advances in a counter clockwise direction as viewed in FIGURES 1, 9 and 13. The assembly is advanced beneath the ironing roller 220 which is oscillated to roll down the trailing end of the band B, the band ends being freed by cut off of the vacuum to the ports 176 through rotation of the wheel 158 relative to the vacuum manifold 167. The leading end of the band is rolled down into overlapping relation with the trailing end thereof as the assembly is advanced beneath spring pressed roller 245 and the banded package assembly is ejected into the discharge chute 250 by engagement with the rollers on the ejector plates 225.

While particular materials and specific details of construction are referred to in describing the machine illustrated, it will be understood that the use of other materials and details of construction of an equivalent nature may be resorted to within the spirit of the invention.

We claim:
1. A machine for stacking and banding articles which comprises an infeed conveyor means operative to advance a series of separate articles of generally rectangular form and random spacing, a conveyor for receiving the articles from said infeed conveyor and advancing the same, means for segregating pairs of the articles which are aligned in the direction of advance thereof with the articles of each pair juxtaposed and with successive pairs in spaced relation on said receiving conveyor, an elongated horizontally disposed conveyor on which successive pairs of the articles are received at longitudinally spaced intervals, means associated with said horizontally disposed conveyor for stacking the articles of each longitudinally spaced pair thereof, one above the other, a band applying conveyor having spaced pockets positioned to receive successive pairs of the articles in stacked relation in said pockets thereof, means for supplying relatively narrow elongate bands of flexible sheet material, means for transferring successive bands to the pockets of said band applying conveyor, means for advancing successive stacked articles to said band applying conveyors, means for moving each stacked pair of articles against a band and into a pocket of the band applying conveyor so as to partially wrap the band around the articles, means for folding the ends of the band about the articles and into overlapping relation and securing the overlapped portions thereof and means to discharge the banded articles from the band applying conveyor.

2. A machine for stacking and banding articles which comprises an infeed conveyor means operative to advance articles of generally rectangular form which are delivered thereto with random spacing and aligned in the direction of travel, a device for sensing the presence of the articles and for advancing the articles in pairs with the articles of each pair juxtaposed and with successive pairs in longitudinally spaced relation, means co-operating with said conveyor means for stacking the articles of each pair, a band applying conveyor mechanism having spaced pockets positioned to receive successive pairs of the articles in stacked relation in said pockets, means for positioning a relatively narrow elongate band of flexible sheet material across each of the pockets of said band applying conveyor, means for moving each stacked pair of articles from said stacking means to said band applying conveyor, means to move each stacked pair against a band and into a pocket of the band applying conveyor so as to partially wrap the band around the pair of articles, means for folding the ends of the band about the articles and into overlapping relation and means to discharge the banded articles from the band applying conveyor.

3. A machine for stacking and banding articles which comprises a conveyor means operative to advance articles of generally rectangular form, a device for sensing the presence of the articles and for advancing the articles in pairs with the articles of each pair juxtaposed and with successive pairs in spaced relation, means co-operating with said conveyor means for stacking the articles of each pair, a band applying conveyor mechanism having spaced pockets positioned to receive successive pairs of the articles in stacked relation in said pockets, means for positioning a relatively narrow elongate band of flexible sheet material across each of the pockets of said band applying conveyor, means for moving each stacked pair of articles against a band and into a pocket of the band applying conveyor so as to partially wrap the band around the pair of articles, means for folding the ends of the band about the articles and into overlapping relation and means to discharge the banded articles from the band applying conveyor, said conveyor means including a horizontally disposed main conveyor and an infeed conveyor with said device for sensing the presence of the articles and advancing the same in pairs being interposed between the main conveyor and the infeed conveyor so as to segregate the articles in pairs and advance successive pairs of articles from the infeed conveyor to the main conveyor, and said device for sensing the presence of the articles including longitudinally spaced article sensing means and article gripping traveling conveyor members, and means for operating the traveling conveyor members under the control of the article sensing means.

4. A machine for stacking and banding articles which comprises an infeed conveyor means operative to advance articles of generally rectangular form which are delivered thereto with random spacing and aligned in the direction of travel, a device for sensing the presence of the articles and for advancing the articles in pairs with the articles of each pair juxtaposed and with successive pairs in longitudinally spaced relation, means co-operating with said conveyor means for stacking the articles of each pair, a band applying conveyor mechanism having spaced pockets positioned to receive successive pairs of the articles in stacked relation in said pockets, means for positioning a relatively narrow elongate band of flexible sheet material across each of the pockets of said band applying conveyor, means for moving each stacked pair of articles from said stacking means to said band applying conveyor, means to move each stacked pair against a band and into a pocket for the band applying conveyor so as to partially wrap the band around the pair of articles, means for folding the ends of the band about the articles and into overlapping relation and means to discharge the banded articles from the band applying conveyor, and adhesive applying means associated with said conveyor means in advance of said device for sensing the presence of the articles and advancing the same in pairs, which adhesive applying means is operative to apply adhesive to the topmost surface of the trailing article of each pair thereof which is advanced on said conveyor means.

5. A machine as set forth in claim 4 and said adhesive applying means comprising a supply container and co-operating applicator members mounted for reciprocation toward and from the conveyor means so as to engage the applicator members with the trailing article of each pair of articles advancing on said conveyor means.

6. A machine for stacking and banding articles which comprises a conveyor means operative to advance articles of generally rectangular form, a device for sensing the presence of the articles and for advancing the articles in pairs with the articles of each pair juxtaposed and with successive pairs in spaced relation, means co-operating with said conveyor means for stacking the articles of each pair, a band applying conveyor mechanism having spaced pockets positioned to receive successive pairs of the articles in stacked relation in said pockets, means for positioning a relatively narrow elongate band of flexible sheet material across each of the pockets of said band applying conveyor, means for moving each stacked pair of articles against a band and into a pocket of the band applying conveyor so as to partially wrap the band around the pair of articles, means for folding the ends of the band about the articles and into overlapping relation and means to discharge the banded articles from the band applying conveyor, and said means for stacking the articles of each pair thereof comprising a platform device mounted for reciprocal movement in a vertical path above said conveyor means, means for reciprocating said platform device in timed relation to the advance of articles on the conveyor means and means for guiding each pair of articles so as to deposit the leading article of each pair on said platform device and to position the trailing article of each said pair beneath the platform device while the platform device is at the upper end of its path so as to stack the articles when the platform device is lowered.

7. A machine as set forth in claim 6 and cam means operable in timed relation to the movement of the conveyor means for controlling the movement of said platform device.

8. A machine for stacking and banding articles which comprises an article supporting endless traveling conveyor assembly having co-operating means for segregating articles in longitudinally aligned and spaced paired relation and advancing the same in a generally horizontal path, stacking means associated with said conveyor assembly in advance of said segregating means for interrupting the advance of the leading article of each pair thereof by lifting said leading article above the supporting conveyor and depositing said leading article on the trailing article of said pair so as to form a stacked double unit article assembly adapted for encirclement by a confining band, a band applying conveyor adjacent the discharge end of said article supporting conveyor having article receiving pockets, means for supplying flexible bands of sufficient length for encompassing the article assemblies, means to feed the bands to the pockets of the band applying conveyor, means for holding the bands on the band applying conveyor, means to transfer successive stacked double unit article assemblies from said article supporting conveyor by lifting the same into the pockets of said band applying conveyor.

9. A machine as set forth in claim 8, said band applying conveyor pockets having means for resiliently engaging the article assemblies so as to retain said assemblies in the pockets, and means adjacent said band applying conveyor which extends into the path of a portion of said article assemblies for forcing the article assemblies out of the conveyor pockets.

10. A machine as set forth in claim 9 and said means for forcing the articles out of the banding conveyor pockets comprising a curved plate member positioned with a portion thereof in the path of the article assemblies so as to engage the assemblies and cam then out of said conveyor pockets as said banding conveyor advances.

11. A machine as set forth in claim 8 and said band applying conveyor having means for varying the depth and width of said article receiving pockets.

12. A machine as set forth in claim 8 and said band applying conveyor having means for rolling down the ends of the bands in overlapping relation.

13. A machine as set forth in claim 8 and said band applying conveyor having means for holding the article encompassing bands in opened out pocket spanning relation and heating elements mounted adjacent the path of the conveyor pockets for activating an adhesive on the bands.

14. A machine as set forth in claim 8, said band applying conveyor comprising a rotatably mounted wheel-like turret having peripherally spaced pockets, which turret is disposed relative to said article supporting conveyor and said transfer means for the article assemblies so that the article assemblies may be moved from the article supporting conveyor into the pockets of the turret, and said transfer means for the article assemblies including means for moving the article assemblies from the article supporting conveyor to the turret while the article supporting conveyor and the turret are in motion.

15. A machine for stacking and banding articles which comprises an article supporting endless conveyor having co-operating means for segregating articles in pairs and advancing the same in a generally horizontal path, means for interrupting the advance of the leading articles of each pair and depositing said leading article on the trailing article of said pair so as to form a stacked double unit article assembly, a band applying conveyor adjacent the discharge end of said article supporting conveyor having article receiving pockets, means for supplying flexible bands of sufficient length for encompassing the article assemblies, means to fed the bands to the pockets of the band applying conveyor, means for holding the bands on the band applying conveyor, means to transfer successive article assemblies from said article supporting conveyor to the pockets of said band applying conveyor, said transfer means for the article assemblies including means for moving the article assemblies from the article supporting conveyor to the turret while the article supporting conveyor and the turret are in motion, and said transfer means for the article assemblies comprising article supporting pads for lifting the articles from the supporting conveyor and guide forming cam means for controlling the movement of said pads.

16. A machine as set forth in claim 8, said band applying conveyor comprising a rotatably mounted wheel-like turret having peripherally spaced pockets, which turret is disposed relative to said article supporting conveyor and said transfer means for the article assemblies so that the article assemblies may be moved from the article supporting conveyor into the pockets of the turret, and an adjustable bottom and side forming member in each pocket of said turret and means for simultaneously adjusting the relative position of the bottom and side forming member in each pocket.

17. A machine as set forth in claim 8 and means for interrupting the feed of the bands to the band applying conveyor which is responsive to the absence of articles on the article supporting conveyor at a predetermined point in the path of movement thereof.

References Cited

UNITED STATES PATENTS

| 787,379 | 4/1905 | Hopkins | 53—234 |
| 2,424,406 | 7/1947 | Marshall | 53—234 X |
| 3,035,379 | 5/1962 | Cloots | 53—234 X |
| 3,201,912 | 8/1965 | Wozniak | 53—153 X |
| 3,322,314 | 5/1967 | Irving et al. | 198—35 X |
| 3,352,435 | 11/1967 | Reinecke | 198—35 X |
| 3,380,227 | 4/1968 | Youngman et al. | 53—234 X |

THERON E. CONDON, Primary Examiner

N. ABRAMS, Assistant Examiner

U.S. Cl. X.R.

53—73, 152, 198; 198—35